Feb. 25, 1941.    M. B. CAMERON    2,232,902
BRAKE MECHANISM
Filed March 31, 1939    2 Sheets-Sheet 1
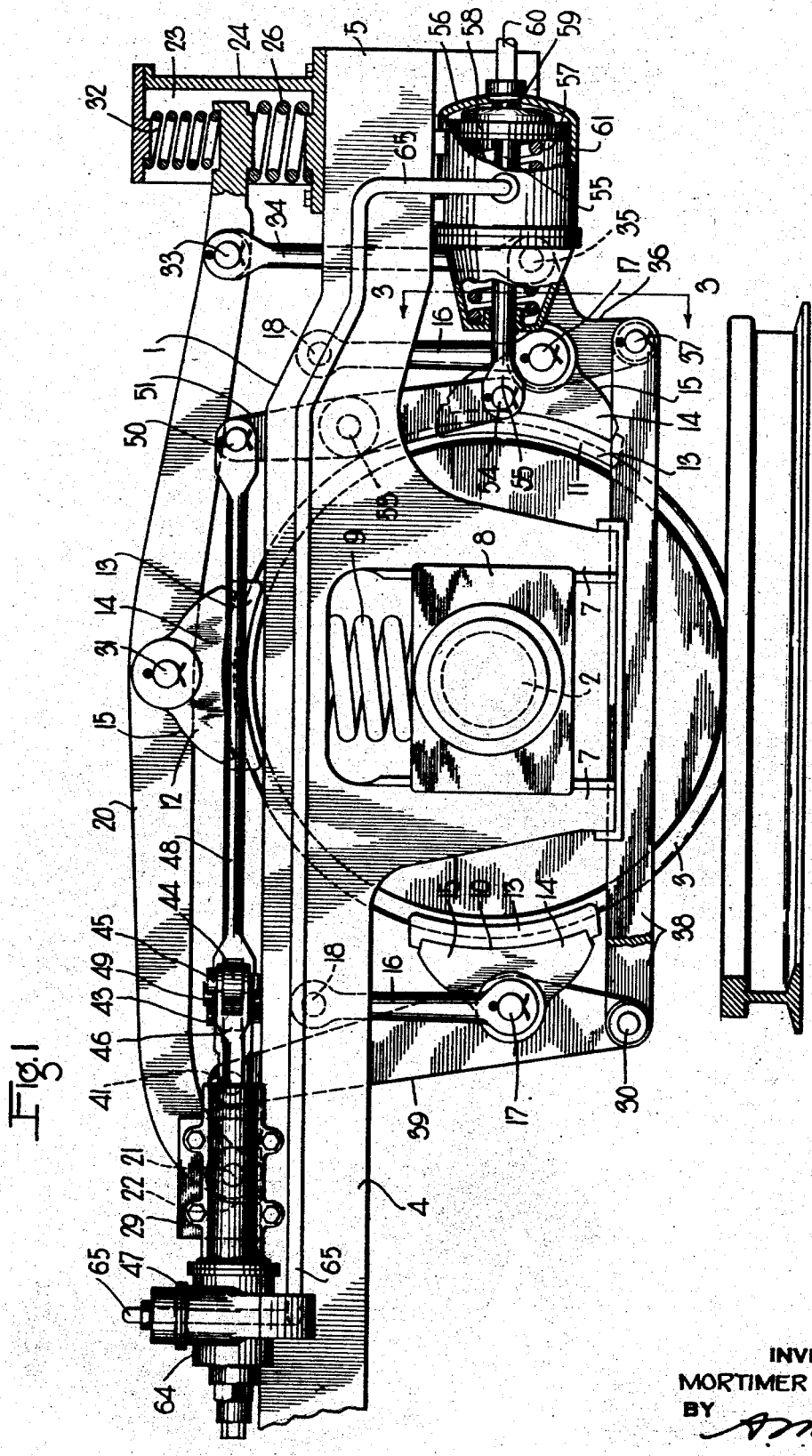
INVENTOR
MORTIMER B. CAMERON
BY
ATTORNEY

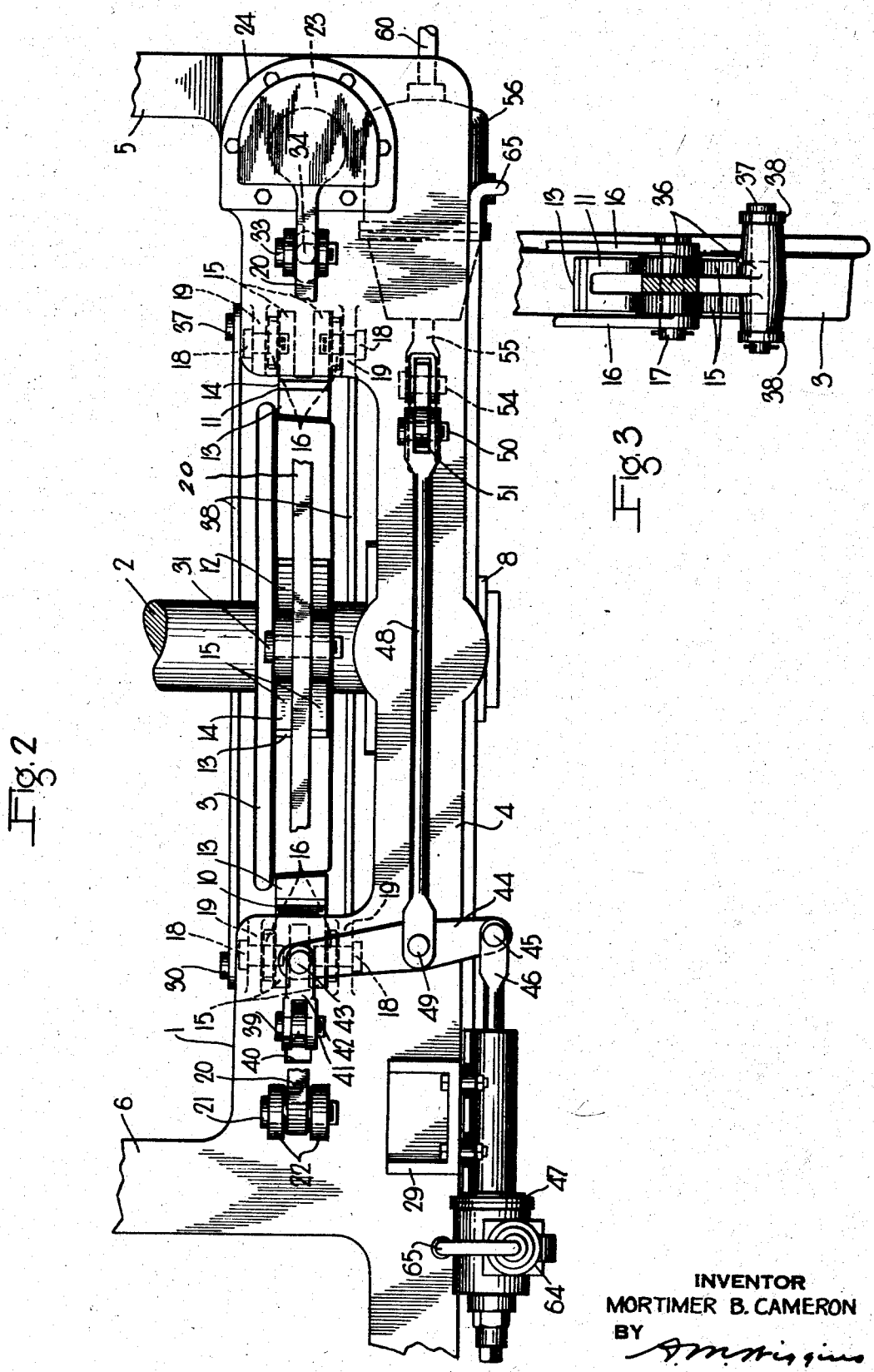

Patented Feb. 25, 1941

2,232,902

UNITED STATES PATENT OFFICE 2,232,902

BRAKE MECHANISM

Mortimer B. Cameron, Edgewood, Pa., assignor to The Westinghouse Air Brake Company, Wilmerding, Pa., a corporation of Pennsylvania Application March 31, 1939, Serial No. 265,209

17 Claims. (Cl. 188—56)

This invention relates to brake mechanism for railway vehicle trucks and more particularly to the general type disclosed in the pending application of Carlton D. Stewart, Serial No. 214,517, filed June 18, 1938, which has become Patent No. 2,177,953, issued Oct. 31, 1939, which embodies a plurality of brake elements arranged in clasp relation at opposite sides of a rotatable member to be braked and one or more additional brake elements disposed above said member and cooperative with the clasp brake elements for braking said member.

In effecting an application of the brakes with the usual type of brake rigging embodying a brake element supported from the truck frame below the horizontal centerline of the truck wheel or other member to be braked, said brake element after engaging the wheel is forced downwardly along the tread of the wheel towards the track rail and acts to pull the frame downwardly in opposition to the usual frame supporting springs.

The degree of the downward movement just described depends mainly upon the pressure applied to the brake element for forcing same into braking engagement with the truck wheel, and where high braking pressures are employed, as in high speed train service, the truck frame may be pulled downwardly against its supporting springs, until it meets a solid stop.

This downward movement of the truck frame in applying the brakes is undesirable for various reasons, one of which is that the compressive force of the frame supporting springs materially interferes with a flexible or accurate control of the release of the brakes on the truck, as will now be described in detail.

High speed trains are usually braked to as great a degree as possible and it is the usual practice to reduce brake cylinder pressure gradually in order to effect a partial release of the brakes when the wheels on the truck have a tendency to slip on the track rails. It is very desirable that this partial release of the brakes be accomplished very quickly and with a minimum reduction of brake cylinder pressure so as to maintain the maximum braking effort on the truck without danger of wheel slipping. This control of release of brakes is not possible however on a truck provided with a brake rigging which acts in effecting an application of the brakes to draw the truck frame down against and thus compress the frame supporting springs, since in attempting to effect a release of the brakes, said springs acting through the medium of the truck frame and brake rigging, drag the brake elements upwardly along the tread of the wheel toward the horizontal center-line thereof and in so moving maintain the brake elements in heavy braking engagement with the wheel.

From this it will be seen that the action of the truck supporting springs offsets to a large extent a reduction in brake cylinder pressure until such time as the truck frame and thereby the brake elements are raised to substantially their normal position, at which time the action of said springs on the brake rigging is annulled and the partial release of the brakes is finally effected through a further reduction in brake cylinder pressure. From this it will be seen that the truck frame supporting springs act to delay a partial release of the brakes and therefore render it necessary to reduce brake cylinder pressure much lower than desired, thus reducing the efficiency and flexibility of control of the release of brakes.

One object of the present invention is to provide a novel brake mechanism of the general type disclosed in the aforementioned Stewart application in which the truck frame supporting springs are not compressed by the braking action of the mechanism, so as to thereby obviate the difficulty just described.

Another object of the invention is to provide a novel multi-shoe brake mechanism which is normally carried by the frame of the truck, and which is so arranged as to set up forces in the brake rigging during braking for opposing, to any desired degree, the forces above described which act to move the truck frame downwardly against the frame supporting springs.

Another object of the invention is to provide a brake mechanism for a rotatable member, such as a wheel, which embodies a plurality of brake elements for engagement with said wheel, and a novel system of levers and links operatively connecting said brake elements for controlling their braking operation.

Another object of the invention is to provide a novel brake mechanism embodying a plurality of brake elements arranged in spaced relation around and adapted to frictionally engage a wheel or other rotatable member to be braked, a system of levers and links operatively connecting said brake elements in serial relation for controlling their operation, and a slack adjuster device connected to one end of said system and automatically operative to compensate for wear of all of said brake elements so as to maintain a predetermined clearance between all of said brake elements and said wheel, when the brakes are released.

Other objects and advantages will be apparent from the following more detailed description of the invention.

In the accompanying drawings, Fig. 1 is a side elevational view of a portion of a vehicle truck and the novel brake mechanism mounted thereon; Fig. 2 is a plan view of a portion of the truck and brake mechanism shown in Fig. 1; and Fig. 3 is a sectional view taken on the line 3—3 in Fig. 1.

Description of parts

As shown in the drawings, the invention is associated with a railway vehicle truck which, for the purpose of illustration, may comprise the usual truck frame 1 and longitudinally spaced wheel and axle assemblies, each of which assemblies may comprise an axle 2 and laterally spaced wheels 3 secured in any desired manner to the axle 2 for rotation therewith.

The truck frame 1 comprises side pieces 4 disposed outboard of the wheels 3 and integrally connected together by transversely extending end members 5 and transoms 6. Adjacent the wheels 3 each side piece 4 is provided with the usual depending pedestals 7 between which is slidably mounted a journal box 8 journaled on the axle 2. A spring 9 disposed between the pedestals 7 is interposed between each journal box 8 and the side pieces 4 of the frame for resiliently supporting said frame from the axle 2.

A brake rigging constructed in accordance with the invention, and to be hereinafter fully described, may be associated with each of the wheels 3 of the truck and all of these brake mechanisms may be identical to each other and operate in the same manner. In view of this and for the sake of simplicity and clarity only one such brake mechanism and the necessary portions of one wheel and axle assembly and of the truck frame are shown in the drawings.

The novel brake mechanism embodying the invention comprises a plurality of friction brake elements 10, 11 and 12 spaced from each other around the peripheral face of a member to be braked, which as shown in the drawings may be in the form of the wheel 3, said brake elements being arranged for braking engagement with the annular tread of said wheel.

The brake elements 10 and 11 are arranged at opposite sides of the tread of wheel 3 in the usual clasp relation and below the horizontal centerline of said wheel. The brake element 12 is arranged above the wheel 3 on the vertical centerline thereof.

Each of the brake elements 10, 11 and 12 may be of identical structure comprising a brake shoe 13 provided on the face adjacent the wheel with a surface for frictional engagement therewith. Each of the shoes 13 is carried by a brake head 14 provided on the side opposite the shoe with spaced parallel flanges 15 extending longitudinally of the head. Each of the clasp arranged brake elements 10 and 11 is supported directly from the truck frame 1 by a pair of spaced, parallel arranged hangers 16 arranged at one end at opposite sides of the flanges 15 of said brake elements and pivotally connected to said flanges by a pin 17. The opposite ends of the hangers 16 connected to each of the clasp brake elements 10 and 11 is pivotally connected by a pin 18 to lugs 19 provided on the side piece 4 of the truck frame, this connection being such with respect to the disposition of said brake elements, that the action of the force of gravity on said elements is adapted to rock said elements away from the wheel 3 to their release positions shown.

Above the side piece 4 of the truck frame and directly over the tread of wheel 3 is disposed a beam or lever 20 which extends longitudinally of said frame and which is pivotally connected at one end by a pin 21 to a pair of spaced lugs 22 projecting from the frame adjacent the transom 6. The other end of the beam 20 is disposed to work vertically in a pocket 23 which is provided in a member 24 secured to the top of side piece 4 adjacent the truck end member 5. A spring 26 disposed in pocket 23 and supported on the lower end wall of member 24 acts on the end of the beam 20.

The beam 20 extends through the space between the flanges 15 on the brake head of the brake element 12 located above the wheel and is pivotally connected to said flanges by a pin 31, the spring 26 acting on the end of beam 20 being provided to normally support said end of said beam and the brake element 12 and to rock said beam in such a direction as to draw the brake element away from the wheel 3 in effecting a release of the brakes after an application, as will be later described.

A spring 32 is interposed between the upper end wall of pocket 23 and lever 20 for securing said lever against undue oscillation which might be caused by the wheel 3 engaging inequalities in the track rails at rail joints or the like.

The end of beam 20 adjacent the end of the truck frame is pivotally connected by a pin 33 to the upper end of a depending link 34 the lower end of which is pivotally connected by a pin 35 to the end of a substantially horizontally extending arm of a bell crank 36. The knee of the bell crank 36 is disposed to operate between the flanges 15 of the brake head of brake element 11 and is pivotally connected to said flanges by the pin 17. The bell crank 36 is provided with a depending arm the end of which is pivotally connected by a pin 37 to one end of a pair of horizontally extending tie rods 38 which are disposed one at either side of the wheel 3. The opposite ends of the tie rods 38 are connected by a pin 38 to the lower end of a live brake lever 39, this lever intermediate its ends being disposed between the flanges 15 of the brake head of the brake element 10 and being pivotally connected thereto by the pin 17. The upper end of this lever extends through a slot 40 in the side piece 4 of the truck frame and is operatively connected by a pin 41 to one end of a horizontally extending link 42 the opposite end of which is pivotally connected by a pin 43 to one end of a lever 44. The opposite end of the lever 44 is connected by a pin 45 to the outer end of a screw 46 of a slack adjuster device 47 which is secured to a bracket 28 rigidly mounted on the side piece 4 of the truck frame.

A pull rod 48 disposed above and extending lengthwise of the side piece 4 is connected at one end by a pin 49 to the lever 44 intermediate its ends. The opposite end of rod 48 is connected by a pin 50 to the upper end of a brake lever 51 which is vertically disposed and extends downwardly through a suitable opening provided through the side piece of the truck frame. This lever 51 intermediate its ends is pivotally mounted on a pin 53 carried by the side piece 4, while the lower end of said lever is pivotally connected by a pin 54 to the outer end of a brake cylinder piston rod 55.

The piston rod 55 projects from a brake cylinder device 56 which is rigidly secured to an under portion of side piece 4 of the truck frame and which is provided with the usual brake cylinder piston 58 for effecting movement of said rod outwardly of the device at the time it is desired to apply the brakes on the truck. The brake cylinder device further comprises the usual release spring 57 acting on the piston 58 for urging the piston back to its release position in effecting a release of the brakes, said spring being contained in a non-pressure chamber 61 which is open to the atmosphere in the usual manner.

On the side opposite the release spring 57 the piston 58 is provided with a pressure chamber 59 connected to a pipe 60 through which fluid under pressure is adapted to be supplied to and released from said chamber for controlling the reciprocation of said piston in the usual well known manner.

The slack adjuster device 47 may be of any desired construction, but for the purpose of illustration may comprise the take-up screw 46 and a fluid pressure operated engine 64 for pulling said screw into the device to take up slack in the brake rigging and thereby maintain a substantially fixed clearance space between the several brake elements and the tread of wheel 3 when said elements are in their release position, regardless of the degree of wear of said elements.

The slack adjuster engine 64 is connected by a pipe 65 to the brake cylinder device 56 and through this pipe fluid under pressure is adapted to be supplied to said engine for effecting its slack take-up operation when, in effecting an application of the brakes, the movement of the brake cylinder piston 58 is excessive and opens the pipe 65 to the pressure chamber 59. If the movement of brake cylinder piston is not excessive in effecting an application of the brakes, then the pipe 65 will not be opened to the pressure chamber 59 so that the slack adjuster will not be operated. It will thus be evident that since the slack adjuster device operates only in case of excessive movement of the brake cylinder piston 58, due to wear of the brake elements, the spacing of said elements from the wheel 3, when the brakes on said wheel are released, will be maintained substantially constant throughout the life of said elements.

When the brakes on the truck are in their release condition, all parts of the brake mechanism will be in the positions shown in the drawings, in which positions the brake elements 10 and 11, supported directly from the truck frame by the hangers 16, will be spaced from the wheel 3, due to the force of gravity acting on said elements. With the brake elements 10 and 11 in their release position, the bell crank 36 and link 34 are conditioned to render the spring 26 effective to support the beam 20 and thereby the brake element 12 in their release positions shown, in which said brake element is also spaced from the wheel 3. It will therefore be evident that since the spring 26 is adapted to support only one end of the beam 20 and the brake element 12 in their brake release positions, said spring may be of relatively low value and thus not have any material effect upon the operation of said beam in effecting an application of the brake, as will be later described.

*Operation of brake mechanism*

When it is desired to effect an application of the brakes, fluid under pressure is supplied through the pipe 60 to the pressure chamber 59 to act on the brake cylinder piston 58 for effecting movement thereof and of the piston rod 55 in the direction of the left hand, as viewed in Fig. 1. This operation of piston rod 55 is transmitted through the lever 51, and pull rod 48 and lever 44 to the live lever 39 to rock said live lever in a clockwise direction.

This movement of the live lever 39 moves the brake element 10 into engagement with the tread of wheel 3 and applies force through the tie rods 38 to the bell-crank 36 for rocking same in a clockwise direction, to thereby effect movement of the brake element 11 into engagement with the tread of the wheel 3. After both brake elements 10 and 11 are thus pulled into engagement with the wheel 3 further movement of the live lever 39 and thereby rocking of the bell crank 36 acts through the link 34 to rock the beam in a clockwise direction for thereby pulling the brake element 12 into engagement with the wheel 3.

After the several brake elements are thus all moved into contact with the wheel 3, the pressure of fluid acting on the brake cylinder piston 58 forces the several brake elements against the tread of said wheel for effecting braking thereof. The degree of pressure with which the several brake elements are thus forced against the wheel 3, and thereby the degree of the braking of said wheel depends upon the pressure of fluid supplied to act on the brake cylinder piston 58 and may be varied as desired, in the usual manner.

When the brake elements 10 and 11 are forced into braking engagement with the wheel 3 it will be evident that the actuating pressure is applied to said elements in a direction substantially parallel to the tie rods 38 and below the axis of said wheel, and as a consequence, a component of said actuating pressure acts in a downwardly direction tending to move said brake elements downwardly along the tread of the wheel. This downwardly acting force at the leading side of the wheel is augmented by the downward drag of the wheel on the brake element and at the trailing side is slightly reduced due to the upward drag of the wheel on the brake element. The forces just described which act on the brake element 10 places its supporting hangers 16 under tension which acts to pull the truck frame 1 down against the supporting spring 9, but the forces acting on the brake element 11 do not place its hangers 16 under tension, due to counteracting forces set up in the brake rigging, and which may be of any desired degree depending upon the design of the brake rigging, and which will now be described.

The downward pulling force applied through link 34 to one end of beam 20 for forcing the brake element 12 into braking engagement with wheel 3 results in the application through pin 21 at the opposite end of said beam of a force applied to the truck frame which acts in an upwardly direction tending to lift said frame. With the brake element 12 engaging the wheel 3 the upper end of the link 34 is substantially fixed against movement so that with further force applied through the tie rods 38 to the bell crank 36 (via pin 37) the bell crank tends to pivot about the pin 35 and thus imposes upon the connected pivot pin 17 a force equal to or exceeding the downwardly acting force, above described, applied to the brake element 11, and which thus acts through the hangers 16 connected to the brake element 11 in an upwardly direction tending to lift the truck frame 1. In other words, the force applied to the brake element 11 which tends to place the supporting hangers 16 under tension and thus draw the truck frame down against the support spring 9 is counteracted by the force applied through the knee of the bell crank to said hangers and acting in an upwardly direction.

As above described, the hangers 16 supporting the brake element 10 are placed under tension which tend to pull the truck frame down against its support spring 9 but this downward pull is counteracted by the upwardly acting force applied through the beam 20 at its fulcrum pin 21 to the truck frame. The brake mechanism is so designed that these counteracting forces will be sufficient to at least counterbalance the downwardly acting forces, and since the counteracting forces are set up and developed coincident with the build up of braking effort between the brake elements 10 and 11 and wheel 3, the truck frame will remain in the same position with respect to the wheel 3 when the brakes are applied as occupied immediately prior to the application.

As a result, the truck frame support spring 9 will not be compressed and will therefore not influence or effect in any way the degree of brake application obtained from the pressure of fluid supplied to act in the brake cylinder device 56.

When it is desired to effect a release of the brakes after an application fluid under pressure is vented from the brake cylinder device 56 through pipe 60, whereupon the release spring 57 acting on the brake cylinder piston acts to return said piston and thereby the piston rod 55 back to their release position, shown in the drawings. This operation of the piston rod 55 acts through the lever 51, pull rod 48, lever 44 and link 42 on the live lever 39 to effect rocking movement thereof in a counterclockwise direction. As the live lever 39 is thus rocked it acts to relieve pressure on the brake element 10 and moves the tie rod 38 in a direction toward the right hand, as viewed in the drawings. This operation of the tie rod 38 acts through the bell crank 36 to relieve pressure of the brake element 11 on the wheel 3 and also to relieve the force on beam 20 and thereby on the brake element 12.

Further rocking of the live lever 39 then acts through the tie rods 38 and bell crank 36 to permit the force of gravity acting on the brake elements 10 and 11 to rock said elements away from the wheel 3 and back to their release positions, and also acts to permit the spring 26 acting on one end of the beam 20 to rock said beam about its fulcrum pin 21 in a counterclockwise direction and thus lift the brake element 12 out of engagement with the wheel 3 and back to its release position.

It will be noted that since in effecting an application of the brakes there is no downward movement of the truck frame relative to the wheel 3 and consequent compression of the support spring 9, any reduction in the pressure of fluid on the brake cylinder piston 58 will be promptly reflected through the system of levers and links in a corresponding or proportional reduction in pressure of the brake elements 10, 11 and 12 on the wheel 3 so that if desired the brakes on the wheel may be quickly released, gradually or in steps corresponding to the degree of reduction in brake cylinder pressure. In other words, the truck frame is secured against vertical movement relative to the car wheel 3 at the time the brakes on the wheel are applied, so as to thereby interfere in no way with the degree of application obtained by the pressure of fluid supplied to act in the brake cylinder device and also to provide for a flexible and accurate control of the release of the brakes on the wheel.

*Operation of slack adjuster device*

It will be noted that the brake elements 12, 11 and 10 are connected in serial relation by a system of operating levers and links connected serially with each other and including at one end of the system the beam 20 fulcrumed on the pin 21 and at the other end of the system the lever 44 which is connected to screw 46 in the slack adjuster device 47, which screw acts as a fulcrum for one end of said system for effecting operation of the several brake elements upon operation of the brake cylinder device.

When the brake shoes 13 on the several brake elements are new, the screw 46 in the adjuster device is adjusted in the usual manner outwardly of said device a sufficient distance to provide a desired clearance space between the several brake elements and the tread of wheel 3, when the brake cylinder piston 58 is in its release position. With this clearance space between the brake elements and wheel the movement of the brake cylinder piston 58 in effecting an application of the brake will be insufficient to connect the pressure chamber 59 of the brake cylinder device to the pipe 65 leading to the slack adjuster engine 47, so that the slack adjuster device will not be operated under such a condition.

As the brake shoes 13 of the several brake elements 10, 11 and 12 wear away, the travel of the brake cylinder piston 58 required to effect movement of said brake elements into braking engagement with the tread of the wheel increases, and when the wear has increased to such a degree that said piston moves beyond the connection with pipe 65 in effecting an application of the brakes, fluid under pressure will flow from the pressure chamber 59 through pipe 65 to the engine 47 of the slack adjuster device. When the brake cylinder piston 58 is returned to its release position upon effecting the subsequent release of the brakes, the slack adjuster pipe 65 is connected to the non-pressure chamber 61 in the brake cylinder device, so that fluid under pressure previously supplied to the slack adjuster engine 47 is vented to the atmosphere, whereupon the slack adjuster engine 47 operates to draw the screw 46 in the direction of the engine a predetermined degree thereby changing the location of the fulcrum pin 45 for the lever 44.

This change in location of the fulcrum pin 45 is reflected, upon the brake cylinder piston 58 obtaining its release position, in the fulcrum pin 41 for the live lever 39 being located closer to the wheel than before the operation of the slack adjuster device.

The consequent change in angularity of the live lever 39 when in its release position acts in effect to reduce the distance between the fulcrum pins 17 and as a consequence between the brake elements 10 and 11 carried by said pins, and since the force of gravity acting on one of said elements opposes that on the other, both of said elements are therefore stopped, in their release movement away from wheel 3, closer to said wheel than previously.

The mass of the brake elements 10 and 11 is such that the force of gravity acting thereon during their release adjustment to wheel 3, as just described, is operable to rock the beam 20 against the spring 26 and thus reduce the clearance space between the brake element 12 and wheel 3. The slack adjustment of the brake elements 10 and 11 is thus reflected in a slack adjustment of the brake element 12, the slack adjustment of the three brake elements being thus effected by the operation of one slack adjuster device.

When the several brake elements again become worn to the extent that the brake cylinder piston 68, in effecting an application of the brakes, moves past the opening to the adjuster pipe 65, the slack adjuster device will again operate as above described to reduce the clearance space between the wheel 3 and the several brake elements when in their release position. The slack adjuster device will thus continue to operate throughout the life of the several brake elements to maintain a substantially fixed movement of the several brake elements away from the wheel in releasing the brakes, and as a result provide for a substantially constant stroke of the brake cylinder piston in effecting an application of the brakes.

Summary

It is important to note that the novel brake mechanism above described provides for accurate and flexible control of the brakes on the truck, due to the fact that its design provides forces in the truck to prevent downward movement of the truck frame which tends to be effected by downwardly acting forces created by forcing the clasp arranged brake elements into engagement with the wheel 3 below the horizontal centerline thereof. All of the brake elements are forced into engagement with the wheel by action of the brake cylinder device through a novel system of levers and links which connect the several brake elements together, and which provide for the ready slack adjustment of all of said brake elements by a single slack adjuster device connected to one end of the system.

While one illustrative embodiment of the invention has been described in detail, it is not the intention to limit its scope to that embodiment or otherwise than by the terms of the appended claims.

Having now described my invention, what I claim as new and desire to secure by Letters Patent, is:

1. A brake mechanism for a vehicle truck having a rotatable member to be braked provided with an annular braking surface, said mechanism comprising a brake element disposed to frictionally engage said surface, a hanger connected to said brake element for supporting same, a bell-crank having its knee connected to said brake element and having a substantially, horizontally extending arm, vertically adjustable means connecting said arm to said frame, and means connected to the other arm of said bell-crank arranged to apply a substantially, horizontal force to said other arm for moving said brake element into braking engagement with said surface.

2. A brake mechanism for a vehicle truck having a rotatable member to be braked provided with an annular braking surface, said mechanism comprising a brake element disposed to frictionally engage said surface, a hanger for said brake element, a bell-crank having a substantially, horizontally extending arm, a pin pivotally connecting said hanger and the knee of said bell-crank to said brake element, a vertically movable member connected to said arm, means connected to the other arm of said bell-crank for actuating said bell-crank, and means for limiting vertical movement of said member to provide for operation of said bell-crank by said actuating means to move said brake element into braking engagement with said surface.

3. A brake mechanism for a vehicle truck having a rotatable member to be braked provided with an annular braking surface, said mechanism comprising a pair of brake elements arranged in clasp relation at opposite sides of said member for frictionally engaging said surface, a hanger connected to each of said brake elements for supporting same, a bell-crank having a substantially, horizontally extending arm and connected at its knee to one of said brake elements, a member movable in a generally vertical direction connected to said arm, a live lever operatively connected to the other brake element and to the other arm of said bell-crank, and means for limiting vertical movement of the vertically movable member for rendering said live lever and bell-crank operable to move said brake elements into braking engagement with said surface.

4. A brake mechanism for a vehicle truck having a rotatable member to be braked provided with an annular braking surface, said brake mechanism comprising a brake element adapted to frictionally engage said surface at one side of said member, another brake element adapted to frictionally engage said surface adjacent the vertical center-line of said member, a bell-crank pivotally connected at its knee to one of said brake elements, means connecting one of the arms of said bell-crank to the other brake element, and means operative on the other arm of said bell-crank for effecting movement of both of said brake elements into braking engagement with said rotatable member.

5. A brake mechanism for a vehicle truck having a rotatable member to be braked provided with an annular braking surface, said mechanism comprising a brake element disposed to frictionally engage said surface on one side of said member, a second brake element disposed to frictionally engage said surface at the top of said member, a lever for operating said second brake element, a bell-crank connected at its knee to said first brake element and having one arm connected to said lever, and means operatively connected to the other arm of said bell-crank for operating same and thereby said lever to move both of said brake elements into braking engagement with said surface.

6. A brake mechanism for a vehicle truck having a rotatable member to be braked provided with an annular braking surface, said mechanism comprising a brake element disposed at one side of said rotatable member for frictionally engaging said surface, a second brake element disposed above said rotatable member for frictionally engaging said surface, a lever pivotally connected to said frame and second brake element for controlling the operation thereof, means for supporting the first named brake element from said frame in braking relation with said rotatable member, a bell-crank pivotally connected at its knee to said first brake element and having a substantially, horizontally extending arm, a tension member connecting said arm to the first named lever for controlling its operation, and means for applying a substantially, horizontally acting force to the other arm of said bell-crank for effecting operation of said bell-crank and lever to move both of said brake elements into braking engagement with said surface.

7. A brake mechanism for a vehicle truck having a rotatable member to be braked provided with an annular braking surface, said mechanism comprising a brake element disposed above said member and adapted to be moved into frictional engagement with said surface, a beam having a fulcrum connection with said frame and carrying said brake element, means acting on said beam for supporting said brake element out of engagement with said surface, a second brake element disposed at one side of said rotatable member and adapted to be moved into frictional engagement with said surface, a hanger supporting said second brake element from said frame, a bell-crank pivotally connected at its knee to said second brake element and having a substantially, horizontally extending arm, a tension member connecting said beam to said arm, and means for applying a substantially horizontally acting force to the other arm of said bell-crank for operating said bell-crank and beam to effect movement of both of said brake elements into braking engagement with said surface.

8. A brake mechanism for a vehicle truck having a truck frame and a rotatable member to be braked provided with an annular braking surface, said brake mechanism comprising at least three brake elements two of which are arranged at opposite sides of said rotatable member in clasp relation for braking engagement with said surface, while the third is arranged above said rotatable member for braking engagement with said surface, a beam having a fulcrum connection with said frame and connected to said third brake element, a spring acting on said beam for supporting said third brake element from said frame, a hanger for each of said clasp brake elements supporting same from said frame, a bell-crank pivotally connected at its knee to one of said clasp brake elements and having a substantially, horizontally extending arm, a link connecting said arm to said beam, a live-lever pivotally connected to the other clasp arranged brake element, means for actuating said live lever, and means operatively connecting said live lever to the other arm of said bell-crank for effecting operation of said bell-crank and said link and beam to effect movement of all of said brake elements into frictional engagement with said surface.

9. A brake mechanism for a vehicle truck having a truck frame and a rotatable member to be braked provided with an annular braking surface, said brake mechanism comprising at least three brake elements two of which are arranged at opposite sides of said rotatable member in clasp relation for braking engagement with said surface, while the third is arranged above said rotatable member for braking engagement with said surface, a beam having a fulcrum connection with said frame and connected to said third brake element, a hanger for each of said clasp brake elements supporting same from said frame, a bell-crank pivotally connected at its knee to one of said clasp brake elements and having a substantially, horizontally extending arm, a link connecting said arm to said beam, a live lever pivotally connected to the other clasp arranged brake element, means for actuating said live lever, and means operatively connecting said live lever to the other arm of said bell-crank for operating said bell-crank and said link and beam to effect movement of all of said brake elements into frictional engagement with said surface, said hangers and clasp brake elements being so arranged that said clasp brake elements are movable out of engagement with said surface due to the force of gravity, and a spring acting on said beam for disengaging said third brake element from said surface upon disengagement of said clasp brake elements from said surface.

10. A brake mechanism for a vehicle truck having a truck frame and a rotatable member to be braked provided with an annular braking surface, said mechanism comprising a brake element disposed above said member for frictionally engaging said surface, a beam disposed above said member having a pivotal connection with said frame and carrying said brake element, a pair of brake elements arranged in clasp relation at opposite sides of said member, a hanger for each of said clasp brake elements, a bell-crank having its knee connected to one of said clasp brake elements and having a substantially horizontally disposed arm, a link connecting said arm and beam, a live brake lever operatively connected to the other clasp brake element, a tie rod connecting said live lever to the other arm of said bell-crank, a brake cylinder device operatively connected to said live lever for controlling operation thereof and of said bell-crank and beam to effect movement of all of said brake elements into and out of braking engagement with said rotatable member, and means operative on said beam to disengage the first named brake element from said rotatable member upon disengagement of said clasp brake elements therefrom.

11. A brake mechanism for a vehicle truck having a truck frame and a rotatable member to be braked provided with an annular braking surface, said mechanism comprising at least three brake elements arranged in spaced relation around said surface, two of said brake elements being rigidly supported from said truck frame against vertical movement relative to the frame, a system of levers and links operatively connecting said brake elements in serial relation, one end of said system having a fulcrum connection with said frame, actuating means for applying force to the other end of said system for operating said system to effect movement of all of said brake elements into braking engagement with said surface, and means securing said brake elements against movement with said rotatable member.

12. A brake mechanism for a vehicle truck having a truck frame and a rotatable member to be braked provided with an annular braking surface, said mechanism comprising at least three brake elements arranged in spaced relation around said surface, two of said brake elements being rigidly supported from said truck frame against vertical movement relative to the frame, a system of levers and links connected serially with each other and operatively connecting said brake elements in serial relation, one end of said system having a fulcrum connection with said frame and the other end of said system terminating in a lever having a fulcrum connection with one of said brake elements, and means for applying force to said lever for operating said system to effect movement of all of said brake elements into braking engagement with said surface.

13. A brake mechanism for a vehicle truck having a truck frame and a rotatable member to be braked provided with an annular braking surface, said brake mechanism comprising at least three brake elements for engaging said surface, two of said elements being arranged at opposite sides of said member in clasp relation and the third brake element being disposed above said member, a horizontally extending lever having a fulcrum connection with said frame and connected to said third brake element for controlling its operation, a live brake lever connected to one of said clasp arranged brake elements for controlling its operation, a bell-crank pivotally connected at its knee to the other clasp arranged brake element and having one arm operatively connected to said horizontally extending lever and the other arm operatively connected to said live brake lever, and means for actuating said live brake lever and thereby said bell-crank and horizontally extending lever for effecting movement of all of said brake elements into braking engagement with said surface.

14. A brake mechanism for a vehicle truck having a truck frame and a rotatable member to be braked provided with an annular braking surface, said brake mechanism comprising at least three brake elements arranged in spaced relation around said surface for frictional braking engagement therewith, a system of levers and links operatively connecting said brake elements in serial relation with respect to each other, one end of said system having a fixed fulcrum connection with said frame, a slack adjuster device comprising a slack take-up element providing a fulcrum for the other end of said system, and a brake cylinder device operatively connected to said system for controlling the operation of said brake elements.

15. A brake mechanism for a vehicle truck having a truck frame and a rotatable member to be braked provided with an annular braking surface, said brake mechanism comprising at least three brake elements arranged in spaced relation around said surface for frictional braking engagement therewith, a system of levers and links operatively connecting said brake elements in serial relation with respect to each other, one end of said system having a fixed fulcrum connection with said frame, the other end of said system terminating in a lever, a slack adjuster device comprising a slack take-up element providing an adjustable fulcrum for the last named lever, and a brake cylinder device operatively connected to said last named lever for controlling the operation of said brake elements.

16. A brake mechanism for a vehicle truck having a truck frame and a rotatable member to be braked provided with an annular braking surface, said brake mechanism comprising at least three brake elements arranged in spaced relation around said surface for frictional braking engagement therewith, a system of levers and links operatively connecting said brake elements in serial relation with respect to each other, a slack adjuster device comprising a slack take-up element providing a fulcrum for one end of said system, and a brake cylinder device operatively connected to said system for controlling the operation of said brake elements.

17. A brake mechanism for a vehicle truck having a truck frame and a rotatable member to be braked provided with an annular braking surface, said brake mechanism comprising at least three brake elements for engaging said surface, two of said elements being arranged at opposite sides of said member in clasp relation and the third brake element being disposed above said member, a horizontally extending lever having a fulcrum connection with said frame and connected to said third brake element for controlling its operation, a live brake lever connected to one of said clasp arranged brake elements for controlling its operation, a bell-crank pivotally connected at its knee to the other clasp arranged brake element and having one arm operatively connected to said horizontally extending lever and the other arm operatively connected to said live brake lever, a brake cylinder piston connected to said live lever operative by fluid under pressure to effect the operation of said live lever, said bell-crank and said horizontally extending lever to move all of said brake elements into braking engagement with said rotatable member, a spring operative upon the release of fluid under pressure on said piston to operate said live lever and bell-crank to effect disengagement of said clasp arranged brake elements from said rotatable member, and a spring acting on said horizontally extending lever to effect operation thereof to release said third brake element from said rotatable member upon disengagement of said clasp arranged brake elements from said rotatable member.

MORTIMER B. CAMERON.